US010471946B2

(12) United States Patent
Baehrle-Miller et al.

(10) Patent No.: US 10,471,946 B2
(45) Date of Patent: Nov. 12, 2019

(54) BRAKING DEVICE FOR A MOTOR VEHICLE, AND METHOD FOR CONTROLLING THE BRAKING DEVICE

(71) Applicant: Robert Bosch GmbH, Stuttgart (DE)

(72) Inventors: Frank Baehrle-Miller, Schoenaich (DE); Dieter Blattert, Kirchheim/Neckar (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 165 days.

(21) Appl. No.: 15/516,721

(22) PCT Filed: Aug. 10, 2015

(86) PCT No.: PCT/EP2015/068372
§ 371 (c)(1),
(2) Date: Apr. 4, 2017

(87) PCT Pub. No.: WO2016/055194
PCT Pub. Date: Apr. 14, 2016

(65) Prior Publication Data
US 2017/0297548 A1    Oct. 19, 2017

(30) Foreign Application Priority Data

Oct. 7, 2014   (DE) .................. 10 2014 220 252

(51) Int. Cl.
| *B60T 13/74* | (2006.01) |
| *B60T 7/04* | (2006.01) |
| *F16D 55/226* | (2006.01) |
| *F16D 65/18* | (2006.01) |
| *B60T 7/12* | (2006.01) |
| *F16D 121/02* | (2012.01) |

(Continued)

(52) U.S. Cl.
CPC .............. *B60T 13/741* (2013.01); *B60T 7/04* (2013.01); *B60T 7/12* (2013.01); *F16D 55/226* (2013.01);

(Continued)

(58) Field of Classification Search
CPC .................................................... B60T 13/741
See application file for complete search history.

(56) References Cited

U.S. PATENT DOCUMENTS 6,464,308 B2 * 10/2002 Kubota ................ B60T 13/741
                                                          188/1.11 E
8,448,756 B2 * 5/2013 Knechtges ............... B60T 8/32
                                                             188/72.2

(Continued)

FOREIGN PATENT DOCUMENTS

| CN | 1509925 A | 7/2004 |
| CN | 101835664 A | 9/2010 |

(Continued)

OTHER PUBLICATIONS

International Search Report corresponding to PCT Application No. PCT/EP2015/068372, dated Jan. 22, 2016 (German and English language document) (5 pages).

*Primary Examiner* — Hussein Elchanti
*Assistant Examiner* — Michael A Berns
(74) *Attorney, Agent, or Firm* — Maginot, Moore & Beck LLP

(57) ABSTRACT

A method of applying an automated parking brake of a motor vehicle includes at least two phases. In a first preceding phase, no clamping force is produced by the parking brake. In a second following phase, a clamping force is produced by the parking brake via a controllable parking brake actuator configured to produce the clamping force. The method further includes detecting a transition from the first phase to the second phase based on a temporal progression of a specific parameter of a control of the parking brake actuator. A control unit is configured to perform according to the method, and a parking brake is configured to perform according to the method.

12 Claims, 7 Drawing Sheets

(51) Int. Cl.
 *F16D 121/14* (2012.01)
 *F16D 125/40* (2012.01)
 *B60T 1/06* (2006.01)

(52) U.S. Cl.
 CPC .............. *F16D 65/18* (2013.01); *B60T 1/065* (2013.01); *B60T 13/746* (2013.01); *F16D 2121/02* (2013.01); *F16D 2121/14* (2013.01); *F16D 2125/40* (2013.01)

(56) References Cited

U.S. PATENT DOCUMENTS

| | | | | |
|---|---|---|---|---|
| 9,156,459 | B2* | 10/2015 | Knechtges | B60T 7/042 |
| 9,457,774 | B2* | 10/2016 | Knechtges | B60T 13/588 |
| 9,694,799 | B2* | 7/2017 | Baehrle-Miller | B60T 13/588 |
| 9,731,693 | B2* | 8/2017 | Sakashita | B60T 13/588 |
| 9,937,907 | B2* | 4/2018 | Blattert | B60T 8/885 |
| 2002/0027387 | A1 | 3/2002 | Kubota | |
| 2004/0238299 | A1* | 12/2004 | Ralea | B60T 7/085 |
| | | | | 188/156 |
| 2016/0207623 | A1* | 7/2016 | Carson | B64C 27/82 |

FOREIGN PATENT DOCUMENTS

| | | |
|---|---|---|
| CN | 102189989 A | 9/2011 |
| DE | 10 2004 021 534 A1 | 12/2005 |
| DE | 10 2009 027 479 A1 | 1/2011 |
| DE | 10 2011 004 772 A1 | 8/2012 |
| WO | 2009/053429 A1 | 4/2009 |
| WO | 2013/118770 A1 | 8/2013 |

* cited by examiner

# BRAKING DEVICE FOR A MOTOR VEHICLE, AND METHOD FOR CONTROLLING THE BRAKING DEVICE

This application is a 35 U.S.C. § 371 National Stage Application of PCT/EP2015/068372, filed on Aug. 10, 2015, which claims the benefit of priority to Serial No. DE 10 2014 220 252.3, filed on Oct. 7, 2014 in Germany, the disclosures of which are incorporated herein by reference in their entirety.

The present disclosure relates to a method for controlling a parking brake device, wherein the parking brake is adjusted by means of a sensitive control procedure to meet the requirements of the respective operating situation.

BACKGROUND

The publication DE102011004772A1 for example is known from the prior art. Said publication discloses a method for adjusting the clamping force that is exerted by a parking brake and is generated at least in part by an electromechanical braking device having an electric brake motor. During the procedure, the magnitude of the mechanical work that is produced by means of the actuator is ascertained and the application process is performed until the magnitude of the mechanical work that has been produced achieves a threshold value. In order to ascertain the magnitude of the electrical work that has been produced, electrical variables are used, said electrical variables being in particular the current and the voltage of the electric brake motor that are ascertained preferably directly or indirectly by means of sensors and are present as measured values.

The publication DE102004021534A1 is likewise known. This document relates to a method for an automated parking brake application process that in the case of a motor vehicle leads to an automated parking brake being locked. The core of this prior art resides in the fact that the automated parking brake application process can be performed in a normal operation and in a test operation, wherein the normal operation and the test operation differ at least in terms of the speed at which the parking brake application process is performed. In the test operation, the braking force is initially built up by means of a hydraulic wheel pressure and subsequently the braking force that has been built up in a hydraulic manner is transferred to a mechanical braking force holding device. This prior art discloses that parallel to transferring the hydraulic pressure or after transferring the hydraulic pressure the pressure drops back and when the parking brake is in the locked state the braking force is produced by means of the mechanical braking force holding device independently of the presence of the hydraulic pressure, wherein the magnitude of the braking force that has been built up in a hydraulic manner depends upon the length of time the operating element has been actuated without interruption.

In order to ascertain and adjust a clamping force of a parking brake, the clamping force is estimated by way of example by means of the work that has been produced. Above a defined threshold, the control procedure is switched off accordingly. The minimal clamping force that can be reliably detected in this case is however relatively high since the error component in the case of higher currents is lower. Therefore, malfunctions in the case of higher currents have little effect but malfunctions in the case of lower currents have a greater effect. Furthermore, a multiplicity of operating situations requires a small first force level. Likewise, specific operating conditions do not allow a rapid build-up of a clamping force of the parking brake. The clamping force is therefore built up in the prior art by way of example by means of the hydraulic brake.

In order to be able to continue to use the parking brake for operating situations of this type, it is necessary to design the procedure of controlling the parking brake actuator in such a manner that said parking brake actuator can be adjusted to meet the requirements of the respective operating situation. Furthermore, a sensitive procedure of controlling the parking brake is advantageous. In particular, information relating to an increase in the clamping force is required. This information must be robust, in other words essentially error-free. There is also the requirement for this information to be ascertained as quickly as possible and consequently for said information to be available.

SUMMARY

This object is achieved by virtue of the features of the description, drawings, and claims.

In accordance with the disclosure a method for performing a parking brake application process in the case of a motor vehicle having an automated parking brake, wherein the parking brake application process includes at least two phases, wherein in a first preceding phase a clamping force is not built up by means of the parking brake and in a second following phase a clamping force is built up by means of the parking brake, wherein the parking brake comprises a controllable parking brake actuator for generating the clamping force, is characterized in that a procedure of controlling the parking brake actuator is modified in the event that a transition from the first phase to the second phase is detected.

This is to be understood to mean that the parking brake can be controlled in at least an alternative manner. In an original first manner in the case of a usual parking brake application process, the parking brake is controlled in such a manner so as to render it possible to apply the parking brake fully and rapidly—in particular in a second phase in which clamping force is built up, said second phase following a first phase in which clamping force is not built up. It is possible by means of the modified procedure of controlling the parking brake to modify the behavior of the parking brake. By way of example, it is possible to change the speed of the parking brake application process, in particular to reduce the speed. As a consequence, it is possible by way of example in an advantageous manner to change the speed at which a clamping force between the brake disk and the brake lining is built up. Furthermore, a modification can also reside in an interruption of the parking brake application process. Said interruption can be a time-limited interruption. As a consequence, it is possible by way of example in an advantageous manner to render it possible to switch off the actuator in good time and to avoid any unnecessary application of the brake, in particular an unnecessary and/or undesired build-up of braking force. A further build-up of force can be essentially avoided by way of example by means of a short circuit of the parking brake actuator. The modification relates in particular to a usual performance of the parking brake application process in the second phase.

Furthermore, in accordance with the disclosure a modification is performed in the event that a transition from the first phase to the second phase is detected. The actual transition is essential in this case. The modification is performed directly following the detection of the transition between the phases. This is to be understood to mean that the control procedure is modified essentially directly following the detection of the transition. The term 'control procedure' is to be understood to mean the currently prevailing actual control procedure, in particular current strength and voltage and also the process of the control procedure, in particular the change in the current strength and voltage over time.

In addition to a modification of the parking brake application process in the second phase, it is also possible to modify the parking brake application process in the transition region between the first and second phase. By way of example, in the event that a transition is detected, the parking brake application process is not further performed in the second phase but rather said process continues to be performed at the detected phase transition, in other words in the border region between the first and second phase.

Alternatively, it is also possible to perform a modification of the parking brake application process with back reference to the first phase. For this purpose, by way of example the parking brake application process or the parking brake can be moved back into the region of the first phase and by way of example stopped at that site. For this purpose, the actuator is controlled in such a manner—in particular inverted—in order to move the components of the parking brake in such a manner that the parking brake application process is back in the first phase.

The method in one advantageous embodiment is characterized in that the transition from the first phase to the second phase is detected on the basis of a progression over time of a specific parameter of the procedure of controlling the parking brake actuator.

This is to be understood to mean that the transition from a first phase without the build-up of a clamping force to a second phase with the build-up of a clamping force is identified in an advantageous manner by taking into consideration and evaluating a progression over time of a specific parameter of the procedure of controlling the actuator. In particular the current strength of the actuator is used as a parameter. As a consequence, it is possible to avoid estimating the force for defining a switch-off point. The progression of the parameter is recorded over time. For this purpose, measuring points are selected continuously and the parameter values obtained at these measuring points are recorded. The points in time when measurements are ascertained are in particular spaced apart equally from one another with respect to time. The measurements are performed by way of example every 5 milliseconds. Alternatively, it is also possible to define other points in time for ascertaining measurements. The term 'progression over time of the parameter' is to be understood to mean the development of the parameter values over time. In accordance with the disclosure, a transition is identified if the progression comprises by way of example a correspondingly defined pattern and/or the parameter values have a specific relationship with one another. The method in accordance with the disclosure is suitable for identifying the commencement of the second phase in a robust manner, in other words in an essentially error-free manner. Furthermore, the detection procedure is performed as close as possible to the point in time at which the transition occurs, in other words in a very short period of time—in relation to the parking brake application process—following an actual transition from the first phase into the second phase.

The method in a further advantageous embodiment is characterized in that a transition from the first phase to the second phase is detected if a continuous increase in the clamping force is detected, wherein a continuous increase in the clamping force is detected if multiple, in particular four, current values that are increasing and directly following one another are ascertained as specific parameters of a procedure of controlling the parking brake actuator.

This is understood to mean that a transition from the first phase to the second phase is detected early and in a robust manner by means of evaluating the proximity relations between the digitally measured data points of the motor current. The motor current renders it possible to estimate and/or calculate the prevailing clamping force, therefore the current values are selected as specific parameters of a control procedure. A transition from the first phase to a second phase is identified if a continuous increase in the clamping force is ascertained. A continuous increase in the clamping force is regarded as reliable, in other words that the estimate is robust, if the current continuously increases at multiple, in particular at least four, successive points. The condition for a continuous increase in force is as follows:

$$i(k)>i(k-1)>i(k-2)>i(k-3) \qquad \text{Condition 1:}$$

If, as already described, a measurement is performed every 5 milliseconds, it is possible in an advantageous manner to detect this transition in a time period of 20 milliseconds following the transition from the first phase to the second phase.

The method in a further advantageous embodiment is characterized in that a transition from the first phase to the second phase is detected if a continuous and sufficient increase in the clamping force is detected, wherein a sufficient increase in the clamping force is detected if multiple, in particular 3, increasing differential amounts—of the current values of a procedure of controlling the parking brake actuator that follow one another directly with respect to time—are ascertained, or if multiple, in particular 3, differential amounts—of the current values of a procedure of controlling the parking brake actuator that follow one another directly with respect to time—lie in each case above a threshold value that is allocated to the differential amount, wherein the threshold values are identical or a continuous increase in the threshold values according to the time sequence of the allocated differential amounts is present.

This is understood to mean that a transition is identified if a continuous and sufficient increase in the clamping force is ascertained. Reference is made to Condition 1 with regard to a continuous increase. A sufficient increase is detected if additional multiple, in particular 3, increasing differential amounts—of the current values of a procedure of controlling the parking brake actuator that follow one another directly with respect to time—are ascertained. $d1=i(k-2)-i(k-3)$; $d2=i(k-1)-i(k-2)$; $d3=i(k)-i(k-1)$ are defined as differential amounts.

$$d1<d2<d3 \qquad \text{Condition 2:}$$

In an alternative embodiment, a sufficient increase is detected if multiple, in particular 3, differential amounts—of the current values of a procedure of controlling the parking brake actuator that follow one another directly with respect to time—lie in each case above a threshold value that is allocated to the differential amount, wherein the threshold values are identical or a continuous increase in the threshold values according to the time sequence of the allocated differential is present.

$$d1>a \text{ AND } d2>b \text{ AND } d3>c \qquad \text{Condition 3:}$$

with a<=b<=c

Wherein a "=" represents a linear increase in the force or in the current and "<" represents a progressive increase in the force or current.

Typical values for the threshold values a, b, c are:
a=0.1 to 1 A
b=0.2 to 1 A
c=0.3 to 1 A a, b, c are to be understood in this case as threshold values that can be adjusted to suit the existing braking system or the behavior of the respective components. When selecting the parameters, the following relationship applies: the lower the values of a, b, c, the more sensitive the detection procedure; the lower the values of a, b, c, the more susceptible the detection procedure is to errors.

The method in a further advantageous embodiment is characterized in that current values of a switch-on peak are not taken into consideration when evaluating the current values for the purpose of detecting the increase in clamping force, wherein it is rendered possible by means of a time factor in particular not to take into consideration current values of a switch-on peak, in particular that current values of the first 10 ms of the switch-on process are not taken into consideration and/or it is rendered possible by means of a quantative factor in particular that current values that are above a defined value are not taken into consideration.

This is to be understood to mean that the initial switch-on peak of the motor current is not taken into consideration when ascertaining the clamping force. The switch-on peak comprises high current values for a short period of time. However, in order not to arrive at incorrect values for a clamping force, these values can be excluded during the analysis procedure. By way of example, current values above a specific value indicate a switch-on peak and can be omitted accordingly if they exceed this current threshold value. Since the switch-on peak occurs during a switch-on process, it is also possible in the evaluation process not to take into consideration the current values of a first period of time, in particular of the first 10 milliseconds. Alternatively, these current values are not ascertained at all.

The method in a further advantageous embodiment is characterized in that the procedure of controlling the parking brake actuator is modified in dependence upon a specific operating situation, wherein the specific operating situation is automatically recognized by the vehicle and/or the specific operating situation is activated by the user.

This is to be understood to mean that the control procedure is in other words only modified if a specific operating situation is detected. This renders it possible to perform the modification only in the case of specific operating situations. Different operating situations can lead to the control procedure being modified in a different manner. A specific operating situation can be detected by means of stored profiles or variables. By way of example, possible operating situations are: chassis dynamometer, recalibration, incremental force level application (IFA), rear wheel unlocker (RWU), piloted parking and brake disk wiper.

Inter alia, the parking brakes are to be tested within the scope of the main vehicle testing procedure. The parking brakes are tested in most cases by means of a chassis dynamometer. The chassis dynamometer measures a counter force that can be built-up by means of the brake. However, in order to be able to provide this, the clamping force must not be built up at an arbitrarily fast rate. Parking brakes in a motor on caliper (MoC) construction comprise extremely high dynamics in relation to the build-up of force. This can produce erroneous measurements when function testing the parking brake. The initial build-up of clamping force in particular plays a very important role. Said initial build-up of clamping force must be relatively small so that the vehicle movement can follow the forces in a defined manner on the chassis dynamometer. The described method renders it possible to avoid the vehicle being prematurely removed from the chassis dynamometer and consequently avoid the measurement not being completed.

In the case of the 'operating situation—'recalibration', the term 'recalibration' is understood to mean recalibration of a parking brake. It is possible by means of the procedure for such a recalibration procedure to occur without a significant build-up of pressure. It is advantageous in so doing that—if when performing the recalibration procedure the driver accelerates the vehicle—it is essentially avoided that the rear axle is overbraked. The safety aspect as far as the vehicle is concerned is consequently considerably increased.

In the case of the operating situation 'IFA (incremental force level application)', the clamping force is increased in multiple steps if the driver continuously activates the parking brake switch in the direction of the closed position. The challenge in this case is that this function can occur while the vehicle is traveling (only as a fallback level if the vehicle velocity is not available). The identification of the transition from the first phase to the second phase is advantageous since each further control procedure consequently leads to a build-up of force. Furthermore, the initial clamping force step is in this case also so small that even in the case of unfavorable friction values (fallen leaves, snow) it is not possible for a rear axle to lock immediately.

In the case of the operating situation 'RWU (rear wheel unlocker)', the clamping force is increased until a defined magnitude of slip is achieved between the wheels of the front axle and the wheels of the rear axle. If the slip is greater—for example as a result of snow, rain or fallen leaves, etc.—the clamping force is reduced until the magnitude of slip reduces back below a defined value. Subsequently, the clamping force is increased back up. Alternatively, it is also possible to enter a desired delay as a first target clamping force. Depending upon whether the desired delay or however the slip value is achieved first, the clamping force is not further increased. The advantage is also present in this case if the initial clamping force step is very small. The clamping force can now be increased carefully (also in very small steps) during the control procedure and the reaction of the wheel observed. Since the steps are much smaller than in conventional procedures, it is also possible to perform the control procedure in a correspondingly more sensitive manner.

In the case of the operating situation 'piloted parking', it is rendered possible to park the vehicle or the vehicle parks itself. For this purpose, the procedure is suitable as a fallback level since the free travel of the parking brake during the piloted parking is minimized. It is possible by means of the procedure to detect for example the increase in the clamping force and the parking brake actuator can be controlled for example for a defined period of time of 20 milliseconds in the 'release' direction. The small clamping force step is consequently reduced in size. Should any degradation occur at this point in this function, the parking brake can directly provide a clamping force without having to travel long free travel distances.

In the case of the operating situation 'brake disk wiper', a coating, in particular water, is wiped from the brake disk by means of the parking brake. In so doing, it is possible by means of the procedure for the applied clamping force to be kept to a minimum and to be not noticeable for the driver.

The method in a further advantageous embodiment is characterized in that a prevailing force level is maintained for a defined period of time, in particular in the range 0.5 to 5 seconds and the parking brake application process is subsequently continued.

This is understood to mean that a prevailing force level is maintained for a defined period of time. As a consequence, the parking brake application process is interrupted, in particular in the second phase. This period of time can be advantageously used to test the specific reactions of the vehicle and to adjust the further procedure subsequently. Furthermore, the parking brake application process can be continued following the interruption. The period of time of an interruption is advantageously approx. 0.5 seconds. The period of time can however extend up to 5 seconds. The duration of the defined period of time can be defined adjusted to suit the prevailing operating situation. Furthermore, differences between the first and further interruptions can prove themselves to be advantageous in the case of the same operating situation.

As has already been described, it is possible to essentially avoid a further build-up of force by means of the actuator by means of a short circuit. The motor is relatively intensely braked by means of the self-induction and the further increase in force is greatly minimized.

It is possible in an alternative embodiment for the motor to be simply switched off if the increase in force is detected. In this case, however, the motor rolls on for a short time as a result of the moment of inertia and slightly more force is built up. However, it is not necessary to generate a short circuit for this purpose.

In a further advantageous embodiment, it is also possible in lieu of operating the motor in the short-circuited mode to also reverse energize the motor for a short time. In so doing, the motor is braked even more intensely or rotates in so doing inter alia actually back in the counter direction. A possible build-up of force is consequently immediately neutralized. For this purpose, it is possible by way of example in the case of a detected increase in force to reverse energize the actuator for a defined period of time, by way of example 5 milliseconds.

The method in a further advantageous embodiment is characterized in that during the course of the second phase multiple force levels of the clamping force are set.

This is understood to mean that the parking brake application process is interrupted numerous times. An interruption occurs at a specific force level. This force level can be defined in an absolute manner and accordingly where appropriate approached by means of estimating the force on the basis of an evaluation of the current values of the control procedure. Alternatively, the force level can also be set on the basis of an evaluation of a parking brake application time or a parking brake application travel distance.

However, a further force level is defined in an advantageous manner in relation to a previous force level. In other words, a further force level is approached based on a prevailing force level. In so doing, it is likewise advantageous to achieve a minimal but robust increase in the force level. For this purpose, it is suitable to repeat the already described method. As a consequence, a clamping force can be built up in small force steps. The interruptions, in particular in conjunction with the described holding phases, cause a delay in the parking brake application process. This delay decelerates the parking brake application process. In order by way of example to be able to successfully test the parking brake on the chassis dynamometer, it is necessary for the braking torque to be built up slowly.

The method for setting the first force level or the first force levels—by way of example the first three force levels—can also differ from the method for setting the further force levels—in particular the further force levels that are to be set later. By way of example, a modification can be performed with respect to different threshold values or a different number of differential amounts, times and/or levels of measured values that have not been evaluated. As a consequence, it is possible in an advantageous manner to adjust the control procedure between an initial force level and the subsequent force levels. In particular, the modification is to be performed in an advantageous manner to such an extent that a sensitive control procedure is performed in the sensitive range of the force build-up, whereas towards the end the maximal force is paramount. In so doing, it becomes clear that not only the initial force level can be different from the subsequent force levels but rather also the subsequent force levels can differ from one another.

In an alternative embodiment, the procedure of controlling the parking brake actuator is advantageously modified in such a manner that a reduced clamping force gradient is set. A reduced clamping force gradient is set in relation to a clamping force gradient of a second phase of a usual parking brake application process. The clamping force gradient describes the increase in the clamping force over time. The force builds up more slowly as a result of the reduction. This is achieved in an advantageous manner by means of a reduced travel speed of the actuator. Alternatively, it is also possible to approach multiple clamping force levels, wherein it is not necessary for the interruption to hold for a defined period of time. By way of example, it is possible to switch off the actuator in the event that an increase in the force is detected. Furthermore, the actuator is immediately switched back on once a standstill is achieved.

The method in a further advantageous embodiment is characterized in that the parking brake is moved into a defined, in particular essentially open, starting position and in particular information regarding the transition from the first phase to the second phase is input into a memory device for recalibration purposes.

This is understood to mean that the parking brake is controlled by means of controlling the parking brake actuator in a modified manner into the closed position. With the aid of the method, the transition from the first phase to the second phase is identified and input into a memory device. The information required for the recalibration procedure can be retrieved from said memory device. Subsequently, the parking brake is controlled back into an open starting position.

Furthermore, reference is made to the statements relating to the operating situation 'recalibration'.

The method in a further advantageous embodiment is characterized in that the parking brake is opened in such a manner that a clamping force that has been built up during the second phase is reduced and also an air gap of the first phase remains essentially overcome.

This is understood to mean that the parking brake is controlled by means of the modified procedure of controlling the parking brake actuator into the closed position. With the aid of the method, the transition from the first phase to the second phase is identified. The parking brake is subsequently not moved further in the direction of the closed position but rather is controlled into the open position for a short time so as to reduce the built-up clamping force. Furthermore, reference is made to the statements relating to the operating situation 'piloted parking'.

In accordance with the disclosure a control unit for a motor vehicle having a parking brake, wherein a parking brake application process includes at least two phases, wherein in a first preceding phase a clamping force is not built up by means of the parking brake and in a second following phase a clamping force is built up by means of the parking brake, and wherein the parking brake comprises a controllable parking brake actuator for generating the clamping force, is characterized in that the control unit comprises means by means of which a transition from the first phase to the second phase is detected on the basis of a progression over time of a specific parameter of a procedure of controlling the parking brake actuator.

This is understood to mean that a control unit and/or another computing unit is provided for the motor vehicle, said control unit being designed, in other words being embodied and/or comprising means, for performing or supporting a method—as previously described.

Furthermore, in accordance with the disclosure an automated parking brake in a motor vehicle, wherein a parking brake application process includes at least two phases, wherein in a first preceding phase a clamping force is not built up by means of the parking brake and in a second following phase a clamping force is built up by means of the parking brake, and wherein the parking brake comprises a controllable parking brake actuator so as to generate the clamping force, is characterized in that the parking brake is embodied so as to detect a transition from the first phase to the second phase on the basis of a progression over time of a specific parameter of a procedure of controlling the parking brake actuator.

This is understood to mean that a parking brake is provided for the motor vehicle, which is designed, in other words is embodied and/or comprises means, for performing or supporting a method—as previously described.

Further features and expediency of the disclosure are disclosed in the description of exemplary embodiments with reference to the attached figures.

DETAILED DESCRIPTION

Figure 1:
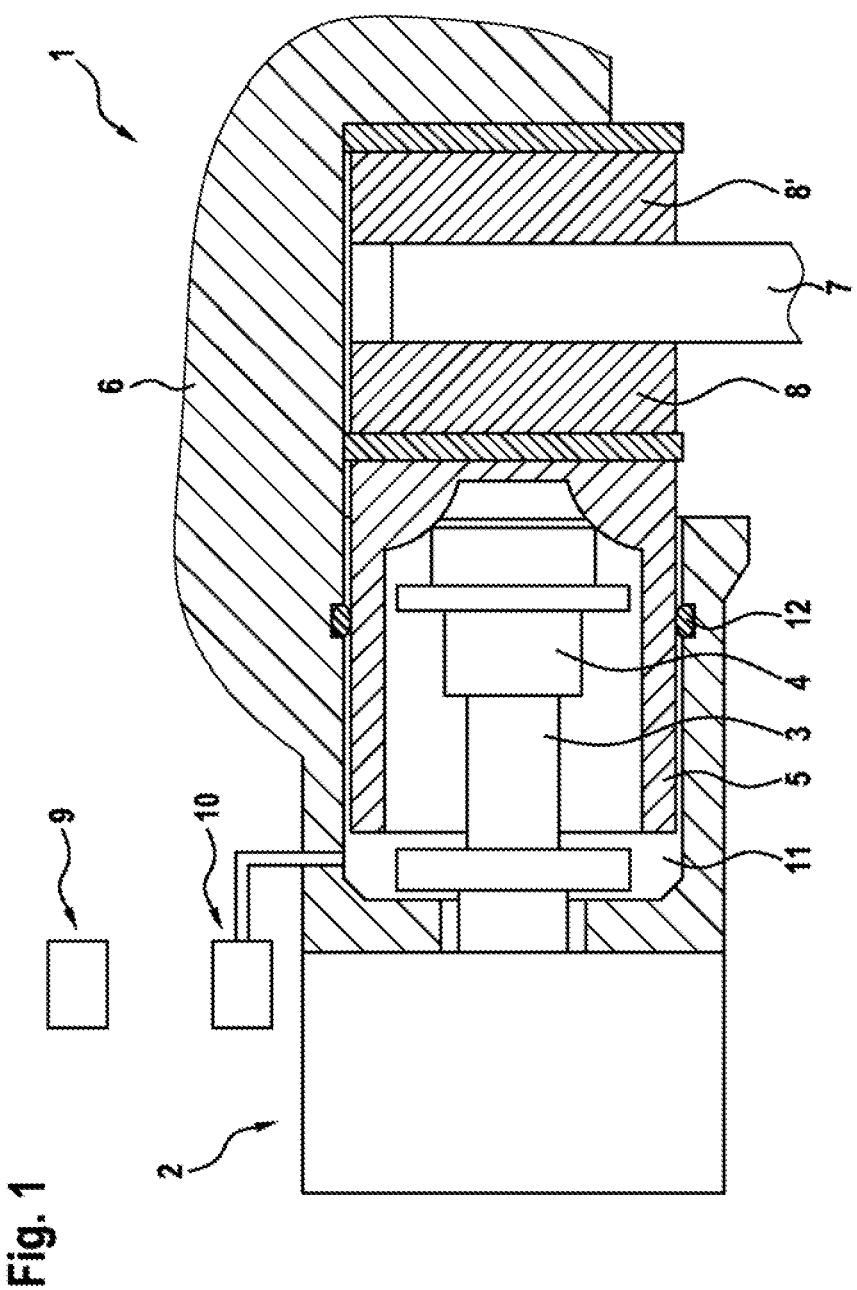
FIG. 1 illustrates as prior art a schematic sectional view of a brake device having an automated parking brake in "motor on caliper" construction.

FIG. 1 illustrates in accordance with the prior art a schematic sectional view of a brake device 1 for a vehicle. The brake device 1 comprises an automated (automatic) parking brake (park brake) that, by means of an actuator 2 (brake motor) that is embodied in the present case as a DC motor, can exert a clamping force so as to secure the vehicle. The actuator 2 of the parking brake drives for this purpose a spindle 3 that is mounted in an axial direction and is in particular a threaded spindle 3. One end of the spindle 3 that is remote from the actuator 2 is provided with a spindle nut 4 that lies against the brake piston 5 when the automated parking brake is in the applied state. The parking brake electromechanically transmits in this manner a force to the brake linings 8, 8' or the brake disk (7). The spindle nut lies against an inner end face of the brake piston 5. The spindle nut 4 and the brake piston 5 are mounted in a brake caliper 6 that grips over a brake disk 7 in a pincer-type manner.

The automated parking brake is embodied by way of example as embodied as a "motor on caliper" system and is combined with the service brake or is integrated in such a service brake. The service brake does however comprise a separate actuator 10. The service brake is designed in FIG. 1 as a hydraulic system, wherein the actuator 10 is represented by means of the ESP pump. In order to build up a braking force by means of the hydraulic service brake, a medium 11 is pressed into a fluid chamber that is defined by means of the brake piston 5 and the brake caliper 6. The brake piston 5 is sealed with respect to the environment by means of a piston sealing ring 12.

The procedure of controlling the brake actuators 2 and 10 is performed by means of a final step, in other words by means of a control unit 9 that can be by way of example a control unit of a driving dynamics system, such as an ESP (electronic stability program) or another control unit. During a procedure of controlling the automated parking brake, it is necessary first to overcome the free travel or the air gap before a braking force can be built up. This applies in a similar manner also for the service brake. The free travel is described by way of example as the distance the spindle nut 4 must overcome by means of rotating the spindle 3 in order to make contact with the brake piston 5. The air gap is described as the distance between the brake linings 8, 8' and the brake disk 7 in the case of disk brake installations in motor vehicles. This procedure is generally relatively long in comparison to the entire control procedure, in particular in the case of the automated parking brake. At the end of a preparation phase of this type, the brake linings 8,8' lie against the brake disk 7 and the build-up of force commences in the case of a further control procedure. FIG. 1 illustrates the state of the already overcome free travel and air gap. In so doing, the brake linings 8, 8' lie against the brake disk 7 and during a following control procedure all brakes, in other words the parking brake and also the service brake, are able to build up a braking force immediately at the corresponding wheel.

Figure 2:
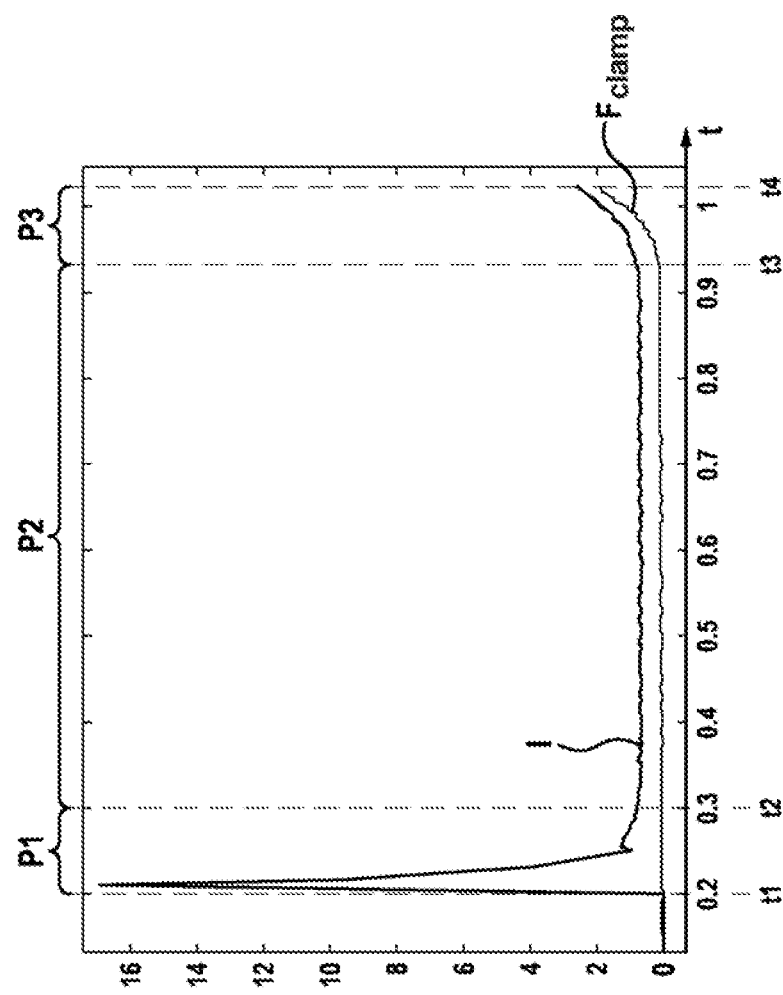
FIG. 2 illustrates a progression of the motor current and clamping force over time in the case of a procedure of controlling the parking brake.

FIG. 2 illustrates an exemplary motor current progression I and also a clamping force progression $F_{clamp}$ in the case of a parking brake over time t when performing a parking brake application process in a usual manner. In the region P1 (also referred to as the "starting phase"), the motor is energized for the first time and the parking brake actuator, in other words the spindle nut that is driven by way of the spindle by means of the actuator of the automated parking brake, is activated or controlled. The two points in time t1 and t2 mark the points in time at which the phase P1 starts and ends respectively. The X-axis represents a time line. It is possible from the points in time on the X-axis to derive by way of example control positions of the parking brake actuator. The point in time t1 corresponds by way of example to the idle position of the parking brake and also of the parking brake actuator. In the region P2 (also referred to as the "idle phase"), the free travel (of the parking brake actuator) and the air gap (between the brake linings 8, 8' and the brake disk 7) are overcome. This phase is defined by means of the two points in time t2 and t3. As can be seen from the time axis, this process is relatively long in comparison to the entire process and can extend up to 1 second. In the region P3 (also referred to as the "force application phase"), a force is built up, in other words by way of example a clamping force $F_{clamp}$ is built up between the parking brake actuator and the brake disk 7. The two points in time t3 and t4 mark the starting point and also the end point of the phase P3. The points in time t3, or t4, represent by way of example a further operating state of the parking brake.

Figure 3:
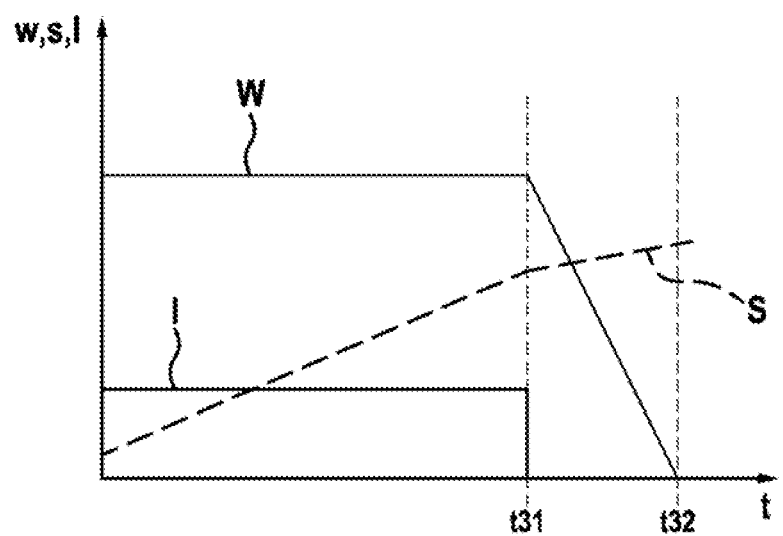
FIG. 3 illustrates a progression of the motor current, the angular velocity and also the travel distance of the parking brake in the case of the motor current being switched off.

FIG. 3 illustrates the behavior of the components during the procedure of switching off the actuator of the parking brake. At the point in time t31, the current I is switched off. As a consequence, an angular velocity w of the actuator 2, also referred to as the motor rotation velocity is reduced. At the point in time t32, the angular velocity w has reduced to the value 0. Prior to the point in time t31, in other words in the case of a by way of example constantly energized actuator 2, such as prevails in the phase P2, the length of the distance travelled increases continuously. After the actuator 2 has been switched off (after the point in time t31), only the rotational moment of inertia is still effective. This is however sufficient to further increase the travel distance s of the parking brake even also in the case of smaller gradients. The travel distance corresponds to the control of the parking brake actuator with regard to its idle position.

Figure 4:
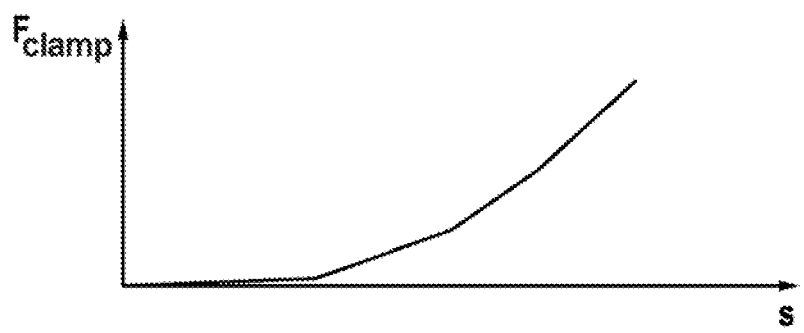
FIG. 4 illustrates a progression of the clamping force over the travel distance of the parking brake.

FIG. 4 illustrates an exemplary increase in the clamping force $F_{clamp}$ over the travel distance of the parking brake. It is evident that, once the brake linings have made contact, each additional distance travelled, by way of example also in the case of the actuator of the automated parking brake being phased out, leads directly to a further build-up of force. If a further build-up of force is not desired, then it is necessary to decelerate the actuator of the parking brake immediately after a switch-off procedure. This can be implemented for example by means of a short circuit of the motor terminals by means of the electronic control system.

Figure 5:
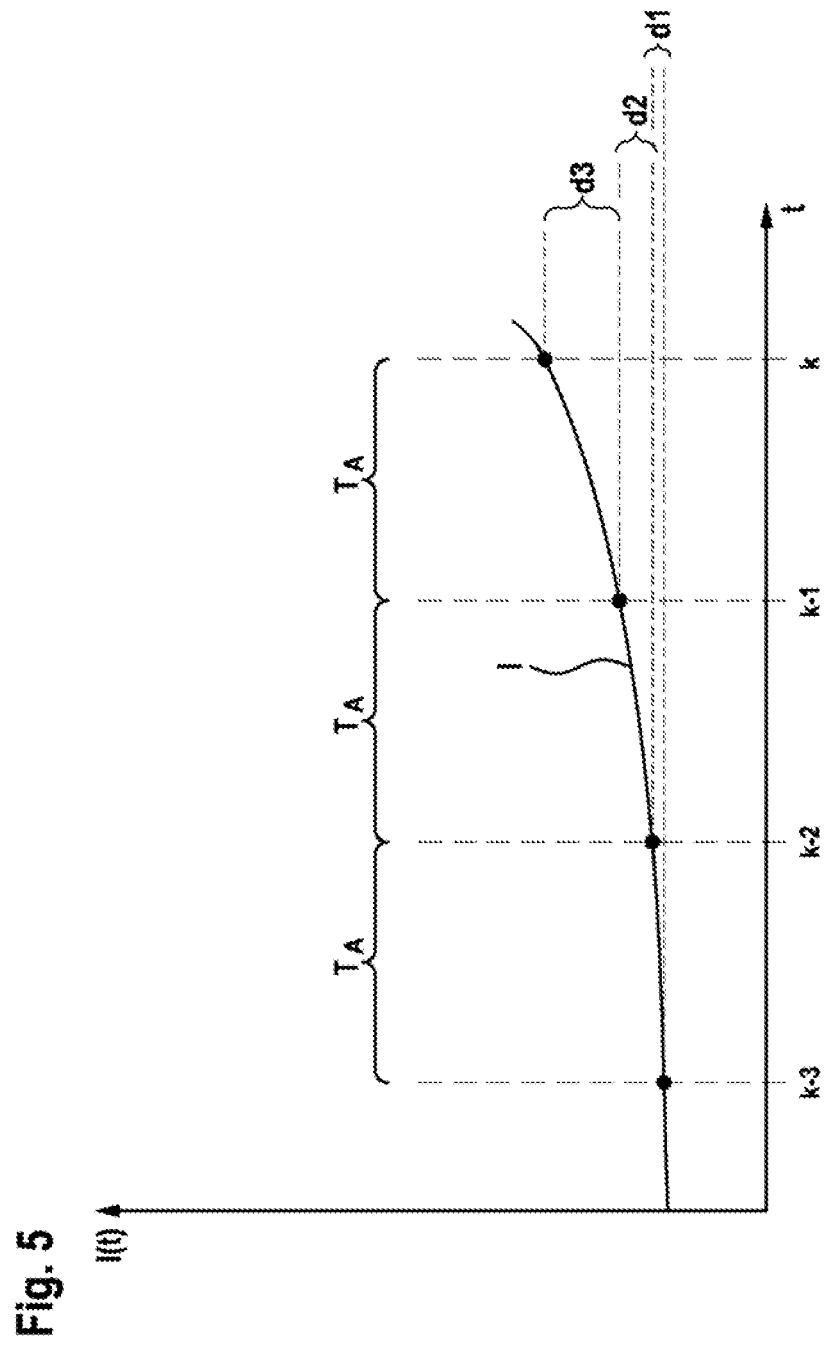
FIG. 5 illustrates an idealized progression of a motor current over time in the case of a clamping force being generated and also the proximity relationships of the measuring points.

FIG. 5 illustrates a current progression I over the time t, such as prevails by way of example within the scope of the force build-up phase P3. The idealized current progression is illustrated schematically.

Furthermore, the measuring points k−3, k−2, k−1, k are indicated. Measurements are taken of the digital data points in each case at an equidistant time spacing $T_A$ between the measuring points. Furthermore, FIG. 5 illustrates the difference d of the current values I that prevails between two adjacent measuring points. For this purpose, the current value differences d1, d2, d3 are indicated.

Figure 6:
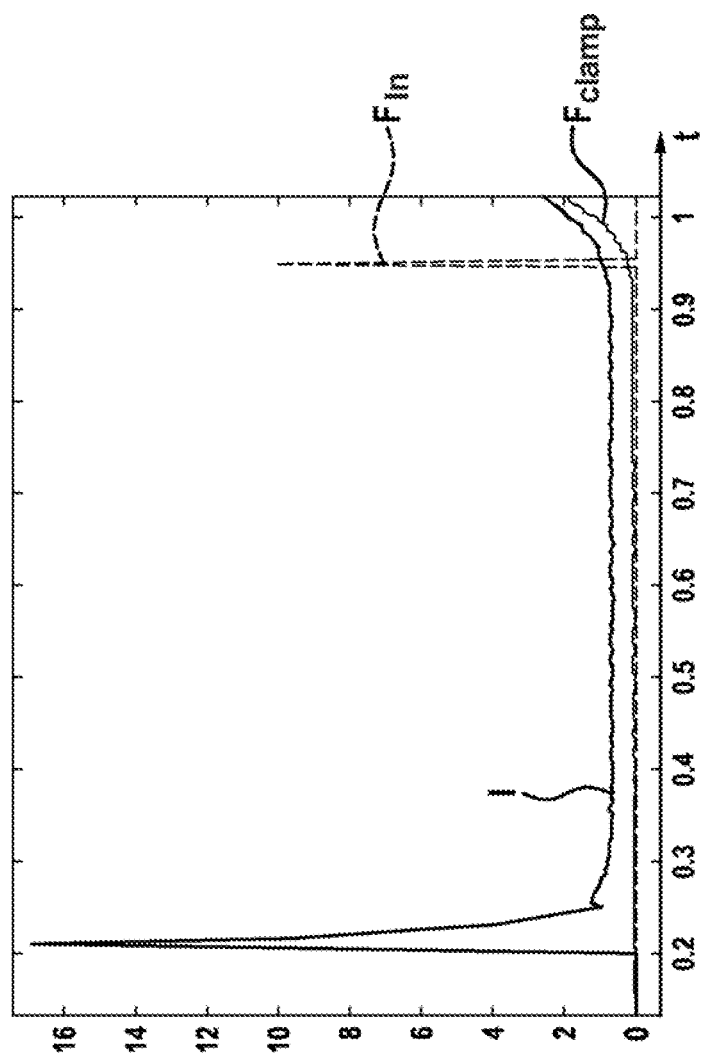
FIG. 6 illustrates a progression of the motor current and clamping force and also an identified force increase in the clamping force over time in the case of an initial force increase.

FIG. 6 illustrates a progress of the motor current I and the clamping force $F_{clamp}$ over the time in the case of an initial force increase. Furthermore, an identified force increase in the clamping force is indicated schematically and by way of example. The peak of the curve $F_{In}$ marks the point in time at which the force increase in the clamping force has been identified. A sampling time of 5 milliseconds has been selected. Furthermore, the condition 1 has been set for a continuous clamping force increase that is considered to be fulfilled if 4 measured values comprise an increasing current value. Current values are taken into consideration by way of example up to 5 amps. In the case of higher current values, a switch-on peak is assumed. FIG. 6 illustrates that during the switch-on peak, the measured current values exceed the defined limit and are therefore not taken into consideration. As a result, a clamping force increase is not detected at this site. Alternatively, it is also possible by way of example not to evaluate the first 10 milliseconds of the switching-on process in order to exclude an initial current peak from the evaluation. The current is almost constant in the subsequent idle phase. In so doing, four successive increasing current values that indicate a clamping force increase are not measured. Only in the case of achieving the actual clamping force increase is the criterion fulfilled after four measured and increasing current values. Detection is possible on the basis of the sampling time and condition after 20 milliseconds after the actual increase.

Figure 7:
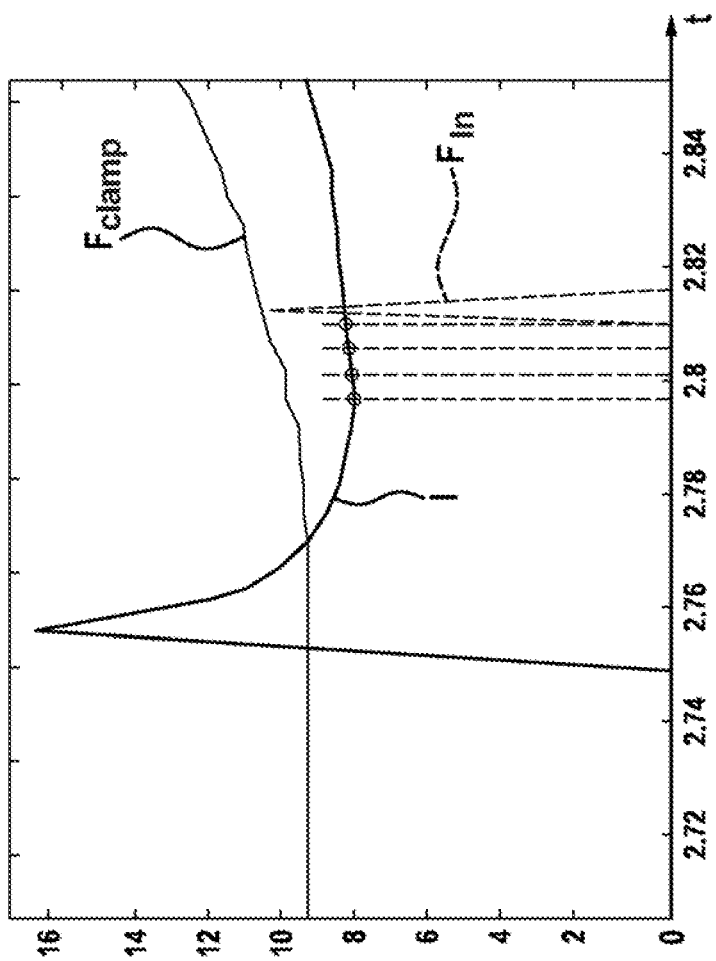
FIG. 7 illustrates a progression of the motor current and clamping force and also an identified force increase in the clamping force over time in the case of a further force step.

FIG. 7 illustrates a progression of the motor current I and the clamping force $F_{clamp}$ and also an identified force increase in the clamping force over time in the case of a further force step. The identified force increase is illustrated by means of a curve $F_{In}$. In contrast to FIG. 6—in which an initial force increase with a preceding idle phase is illustrated—FIG. 7 illustrates the identification of a clamping force increase in the case of a further force step, by way of example a second force step after a previously performed first interruption. FIG. 7 illustrates that an increase in successive current values can be used likewise in the case of a force increase after the first clamping force step and in the case of each further force increase. It is possible by means of an increase in the current values—as already mentioned—to detect an increase in load. As a consequence, it is also possible when using the described method for the clamping force increase between the clamping force step N and the clamping force step N+1 to be very small. It is possible for identifying a force increase to use the identical conditions (four successive increasing current values). These measuring points are indicated in FIG. 7. A sampling time of 5 milliseconds was likewise selected.

Figure 8:
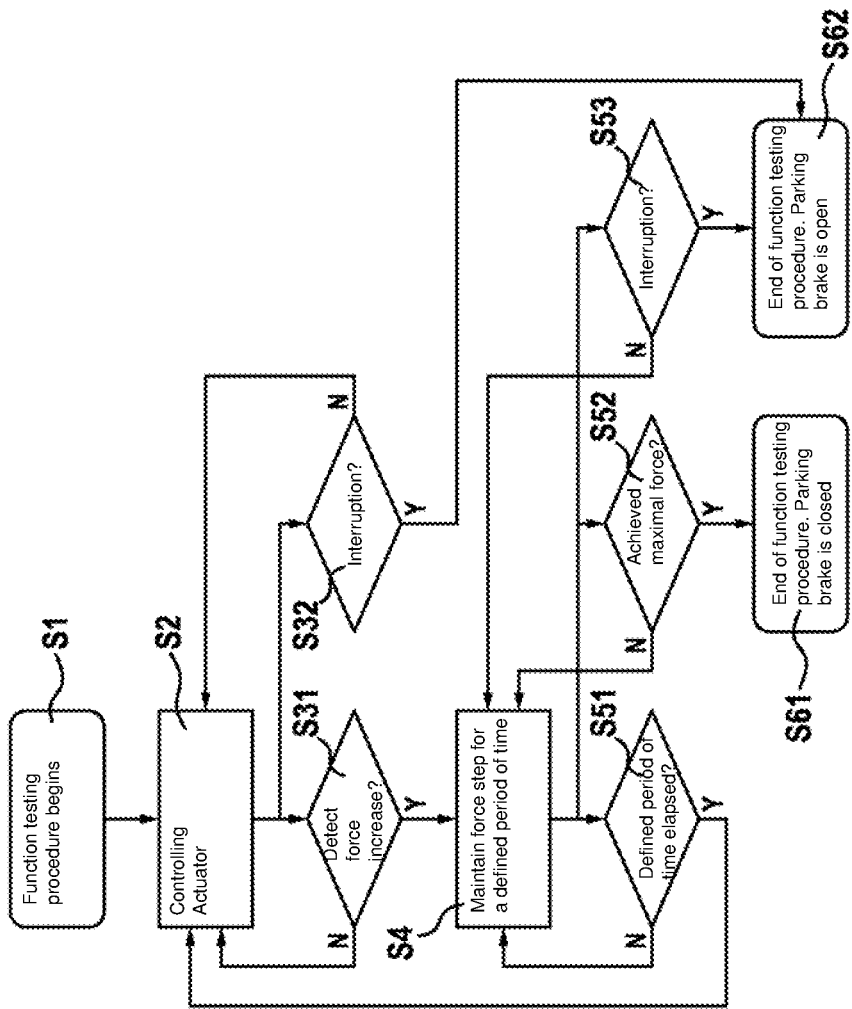
FIG. 8 illustrates a flow diagram of a function test performed on a parking brake within the scope of a main vehicle testing procedure.

FIG. 8 illustrates a flow diagram for function testing an automated parking brake within the scope of the main vehicle testing procedure. The procedure of function testing the parking brake commences with step S1. This can be performed by means of continuously actuating the parking brake switch. In a step S2, the actuator is controlled in the direction of the closed position. Two decisions S31 and S32 follow subsequently. S31 queries whether a force increase is detected. In the event that the response is negative (N), the flow diagram moves back to step S2. In the event that the response is positive (Y), the flow diagram moves forward to step S4. The second decision S32 queries whether the tester has caused an interruption. In the event that the response is negative (N), the flow diagram moves back to step S2. In the event that the response is positive (Y), the flow diagram moves forward to step S52. In a next step S4, the force step is maintained for a defined period of time. Subsequently, three decision steps S51, S52, S53 follow. The first decision step S51 queries whether the defined period of time has already elapsed. In the event that the response is negative (N), the flow diagram moves back to step S4. In the event that the response is positive (Y), the flow diagram moves back to step S2. The second decision step S52 queries whether the maximal force is achieved. In the event that the response is negative (N), the flow diagram moves back to step S4. In the event that the response is positive (Y), the flow diagram moves forward to step S61. The step S61 represents an end of the function testing procedure; the parking brake is closed. The third decision step S53 queries whether the tester has caused an interruption. In the event that the response is negative (N), the flow diagram moves back to step S4. In the event that the response is positive (Y), the flow diagram moves forward to step S62. The step S62 represents an end of the function testing procedure; the parking brake is opened.

The invention claimed is:

1. A method of applying an automated parking brake of a motor vehicle, the parking brake having a controllable parking brake actuator configured to generate a clamping force, the method comprising:
   detecting a transition from a first phase to a second phase; and
   modifying a procedure for controlling the parking brake actuator in response to detecting the transition;
   wherein the first phase occurs while (i) an electric current is being supplied to the parking brake actuator and (ii) there is no build up of the clamping force via the parking brake,
   wherein the second phase, which follows the first phase, includes building up the clamping force via the parking brake and is indicated by the electric current to the parking brake actuator continuously increasing as the clamping force is being built up, and
   wherein the transition is detected by detecting a continuous increase in the electric current.

2. The method as claimed in claim 1, further comprising:
   detecting the transition from the first phase to the second phase based on a progression over time of a specific parameter of the procedure of controlling the parking brake actuator.

3. The method as claimed in claim 2, further comprising:
   ascertaining multiple increasing current values that directly follow each other with respect to time as specific parameters of the procedure of controlling the parking brake actuator; and
   detecting a continuous increase in the clamping force based on the ascertaining of the multiple increasing current values,
   wherein the detection of the transition from the first phase to the second phase is based on the detection of the continuous increase in the clamping force.

4. The method as claimed in claim 3, further comprising:
   ascertaining multiple differential amounts of the current values of the procedure of controlling the parking brake actuator that are, in each case, above a respective threshold value, and that directly follow each other with respect to time, the respective threshold values of the multiple differential amounts either identical or continuously increasing in correspondence with a time sequence of the multiple differential amounts; and
   detecting a sufficient increase in the clamping force based on the ascertaining of at least one of the increasing differential amounts of the current value and the multiple differential amounts of the current values,
   wherein the detection of the transition from the first phase to the second phase is further based on the detection of the sufficient increase in the clamping force.

5. The method as claimed in claim 3, further comprising:
   excluding current values of a switch-on peak from consideration during the detection of the increase in the clamping force based on at least one of:
   a time factor, such that current values from a commencement of the switch-on process and until an end of the time factor are excluded from consideration; and
   a quantitative factor, such that current values that are above the quantitative value are excluded from consideration.

6. The method as claimed in claim 1, wherein the procedure of controlling the parking brake actuator is modified in response to at least one of:
   an automated detection by the motor vehicle of a specific operating situation; and
   activation of the specific operating situation by a user.

7. The method as claimed in claim 1, further comprising:
   maintaining a prevailing force level of the clamping force for a defined period of time; and
   subsequently continuing the applying of the parking brake.

8. The method as claimed in claim 1, wherein the second phase further comprises setting a progression of multiple force levels of the clamping force.

9. The method as claimed in claim 1, further comprising:
   moving the parking brake into a defined starting position; and
   inputting information indicative of the transition from the first phase to the second phase into a memory device for recalibration purposes.

10. The method as claimed in claim 1, further comprising:
    opening the parking brake such that the clamping force that is generated in the second phase is reduced and an air gap from the first phase remains essentially overcome.

11. A control unit for a motor vehicle with a parking brake having a controllable parking brake actuator configured to generate a clamping force in the parking brake, the control unit comprising:
    a detection mechanism configured to detect a transition from a first phase of a parking brake application process to a second phase of the parking brake application process based on a progression over time of a specific parameter of the procedure of controlling the parking brake actuator,
    wherein the first phase occurs while (i) an electric current is being supplied to the parking brake actuator and (ii) there is no build up of the clamping force,
    wherein the second phase, which follows the first phase, includes building up the clamping force via the parking brake and is indicated by the electric current to the parking brake actuator continuously increasing as the clamping force is being built up,
    wherein the transition is detected by detecting a continuous increase in the electric current, and
    wherein the control unit is configured to:
      control the controllable parking brake actuator according to a procedure in response to detecting the transition;
      move the parking brake into a defined starting position; and
      input information indicative of the transition into a memory device for recalibration purposes.

12. An automated parking brake for a motor vehicle, comprising:
    a parking brake actuator configured to:
      in a first preceding phase of an at least two phase parking brake application process, not build up a clamping force in the parking brake while an electric current is being supplied to the parking brake actuator;
      in a second following phase of the parking brake application process, build up a clamping force in the parking brake as the electric current to the parking brake actuator continuously increases; and detect a transition from the first phase to the second phase based on a detected a continuous increase in the electric current; and a control unit configured to:

control the parking brake actuator according to a procedure in response to detecting the transition;

move the parking brake into a defined starting position; and input information indicative of the transition into a memory device for recalibration purposes.

* * * * *